Figure 1:
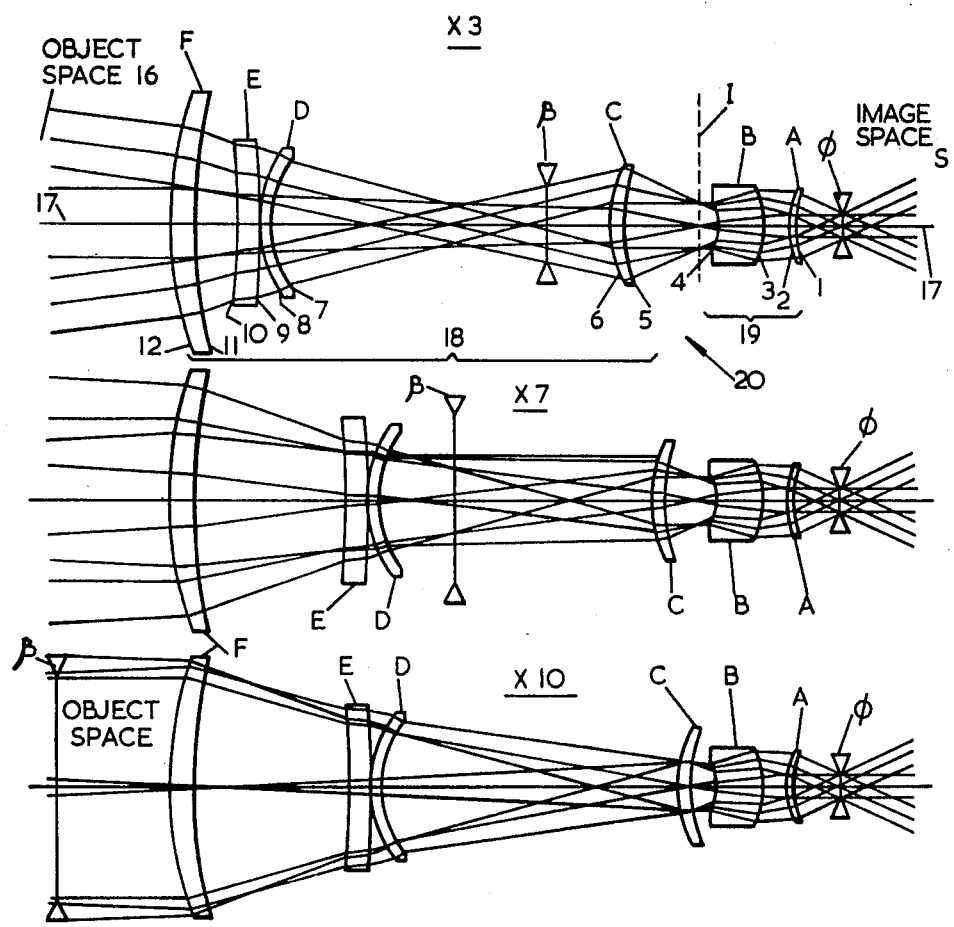

United States Patent [19]

Neil

[11] 4,411,488

[45] Oct. 25, 1983

[54] AFOCAL ZOOM REFRACTOR TELESCOPES

[75] Inventor: Iain A. Neil, Bearsden, Scotland

[73] Assignee: Barr & Stroud Limited, Glasgow, Scotland

[21] Appl. No.: 261,689

[22] Filed: May 7, 1981

[30] Foreign Application Priority Data

May 30, 1980 [GB] United Kingdom ............. 8017264

[51] Int. Cl.³ .................. G02B 1/02; G02B 15/16; G02B 25/00
[52] U.S. Cl. .................. 350/1.4; 350/1.2; 350/569; 350/427; 350/410; G02B/23/00
[58] Field of Search ........... 350/1.2, 1.3, 1.4, 560, 350/570, 427, 453

[56] References Cited

U.S. PATENT DOCUMENTS

| | | | |
|---|---|---|---|
| 3,363,962 | 1/1968 | Vogl | 350/1.4 |
| 3,825,315 | 7/1974 | Altman et al. | 350/1.3 |
| 3,947,084 | 3/1976 | Noyes | 350/1.3 |
| 4,030,805 | 6/1977 | Rogers | 350/1.4 |
| 4,199,217 | 4/1980 | Rogers | 350/1.3 |

FOREIGN PATENT DOCUMENTS

| | | | |
|---|---|---|---|
| 2519961 | 11/1975 | Fed. Rep. of Germany | 350/1.2 |
| 2544148 | 4/1976 | Fed. Rep. of Germany | 350/1.2 |

*Primary Examiner*—Jon W. Henry
*Attorney, Agent, or Firm*—Mason, Fenwick & Lawrence

[57] ABSTRACT

An afocal zoom refractor telescope 20 is formed by a variable magnification achromatic objective system 18 and a fixed focus eyepiece system 19 aligned on a common optical axis 17 and arranged to provide an internal real image I. The objective system 18 is formed by a primary lens element F and three other lens elements C,D,E, and the eyepiece system 19 is formed by two lens elements A,B. The six lens elements A-F are made of a material which has a useful spectral bandpass in the infrared wavelength region and all refractive surfaces (1–12) intercepting the optical axis 17 are substantially spherical. Objective lens system element E which is proximal the primary lens element F is color corrective with a V-value of not less than 120, negatively powered and with a lower refractive index than the remaining objective lens elements (C,D,F). Element E is fixedly coupled to the adjacent lens element D the pair being mounted for movement in a first locus along optical axis 17. Objective system lens element C which is proximal the eyepiece system 19 is mounted for movement in a second locus along the optical axis 17 and the movable elements E,D,C are simultaneously moved through the first and second loci so that the magnification of the telescope 20 can be varied between minimum and maximum values.

7 Claims, 3 Drawing Figures

AFOCAL ZOOM REFRACTOR TELESCOPES

This invention relates to afocal zoom refractor telescopes.

It is an object of the present invention to provide a short length and compact afocal zoom refractor telescope with minimal primary objective oversize.

According to the present invention there is provided an afocal zoom refractor telescope formed by a variable magnification achromatic objective system and a fixed focus eyepiece system aligned on a common optical axis and arranged to provide an internal real image, said objective system being formed by a primary lens element and three other lens elements and said eyepiece system being formed by two lens elements, each of the six lens elements being made of a material which has a useful spectral bandpass in the infrared wavelength region and having refractive surfaces intercepting said optical axis which are substantially spherical, that one of the other objective system lens elements which is proximal the primary lens element being colour corrective, with a V-value of not less than 120, negatively powered, having a lower refractive index than the remaining objective system lens elements, and is fixedly coupled to the adjacent other objective system lens element, said coupled lens elements being mounted for movement in a first locus along the optical axis, the objective system lens element which is proximal the eyepiece system is mounted for movement in a second locus along the optical axis, and means are provided for simultaneously moving said lens elements non-linearly through said first and second loci whereby the magnification of said afocal zoom refractor telescope can be varied between minimum and maximum values.

Figure 2:
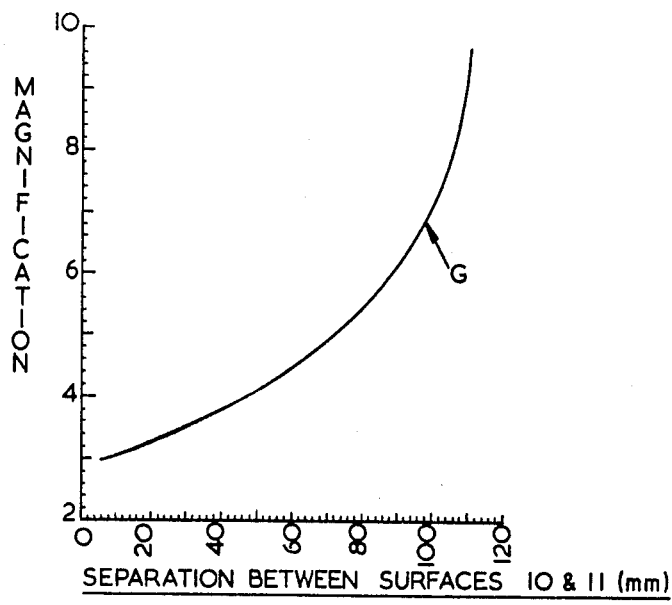
Figure 3:
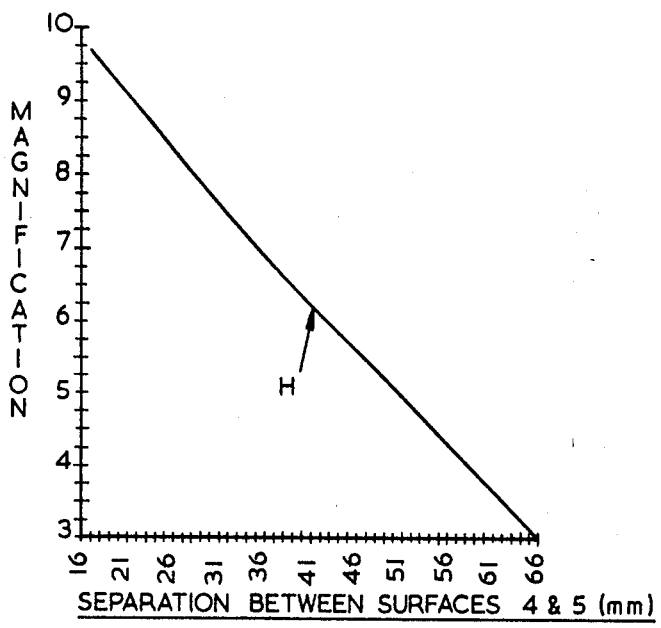

An embodiment of the present invention will now be described by way of example with reference to the accompanying drawings in which;

FIG. 1 is illustrative of the layout of optical components for three magnifications; and FIGS. 2 and 3 illustrate the relative positions of the movable components over the magnification range.

In the drawings the telescope 20 comprises an eyepiece system 19 formed by fixed lens elements A,B and an objective system 18 formed by lens elements C,D,E and F of which F is fixed, D and E are coupled together and movable in a first locus, and C is movable in a second locus. The lens elements A-F are aligned on a common optical axis 17 and have substantially spherical refractive surfaces 1-12 as shown. The objective system 18 has a spherical bandpass in the infrared wavelength region 3-13 microns and receives radiation from object space 16 and forms a real image I within the telescope 20. The eyepiece system 19 also has a spherical bandpass in the infrared wavelength region and collects radiation from the image I and transmits it to image space S via a pupil $\phi$.

Lens element E is made of a material having a lower refractive index than that of the remaining lens elements, is negatively powered and has a dispersive V-value of not less than 120 so that in relation to the other lens elements C,D and F of the objective system 18 element E is colour corrective. This is conveniently achieved by making element E of Chalcogenide glass, designated BS1, manufactured by Barr & Stroud Ltd., all other lens elements being made of germanium.

In order to accommodate large beam diameters element D is of highly meniscus positive-powered type and with elements D and E ganged together for movement along the optical axis 17 in a non-linear first locus G (FIG. 2); corresponding movement of lens element C along its own locus H (FIG. 3), which is also non-linear, produces a range of magnifications for the telescope 20. Conveniently element C is limited in its movement so as not to intercept the image I and, as shown in the drawing, this results in the maximum magnification being restricted by $\times 10$. However if the material of which element C is composed is free from inhomogeneities it may be allowed to pass through image I in order to increase the maximum magnification. This could be achieved, for example, by making element C of zinc selenide which is usually less inhomogeneous than germanium.

Conveniently element E has a refractive index at 20° C. and 10 microns wavelength of not less than 2.45 whereas each of the other lens elements has a refractive index of not less than 4.0. Each of the refractive surfaces 1-12 may be coated with an antireflection coating if so desired. Elements D and E may be adjusted in position independently of element C in order to compensate against thermal variations or to vary the focus of the telescope.

A specific example of telescope construction is given in Table I from which it will be evident that the telescope is compact, having an f/number at the real image I of 2.51 throughout the magnification range of $\times 3$ to $\times 10$ whilst maintaining very high performance (nearto diffraction limited) over the full field for practically all magnifications. Performance figures are given in Table II.

In the specific example the telescope transmits at least 60% of incident 8-13 micron infrared radiation and the diameter of the pupil $\phi$ is constant throughout the magnification range whereas the object space aperture $\beta$ varies in dimension and position and indeed is virtual for the $\times 7$ and $\times 3$ magnifications.

The first locus G through which elements D and E are moved is approximately exponential in character, that is as the magnification factor is increased from its minimum value ($\times 3$) the movements are initially large but as the maximum magnification value ($\times 10$) is reached the movements become quite small. The second locus H through which element C moves is approximately cubic in character, the origin of the cubic characteristic being at a magnification of $\times 6.5$. The more compact the telescope, i.e. the lower the f/number the more extreme is the cubic characteristic.

The elements C-F of the objective system 18 may be scaled to product different magnification ranges with different maximum and minimum magnifications. This will also result in different values of f/number between lens elements 6 and 7 and the more compact the system 18 the greater is the emphasis of the non-linearity of locus H.

The loci illustrated in FIGS. 2 and 3 are taken for a paraxial focus at 100 m. at all magnifications.

TABLE 1

| Lens | Surface | Separation at Magnification | Radius of Curvature | Material | Maximum Aperture Diameter |
|---|---|---|---|---|---|
| Entrance Pupil* | $\phi$ | 0   any | Flat | Air | 15.30 |

TABLE I-continued

| Lens | Surface | Separation at Magnification | | Radius of Curvature | Material | Maximum Aperture Diameter |
|---|---|---|---|---|---|---|
| A | 1 | 33.29 | any | −64.39 | Air | 43.00 |
|   | 2 | 5.00 | any | −52.00 | Ge | 44.60 |
| B | 3 | 17.50 | any | 66.72 | Air | 48.30 |
|   | 4 | 33.32 | any | 45.97 | Ge | 31.50 |
| C | 5 | 66.00 / 35.42 / 16.93 | X3.1 / X7.0 / X9.7 | −117.96 | Air | 73.50 |
|   | 6 | 10.02 | any | −79.60 | Ge | 77.00 |
| D | 7 | 240.46 / 193.53 / 210.27 | X3.1 / X7.0 / X9.7 | −72.30 | Air | 90.00 |
|   | 8 | 8.00 | any | −82.25 | Ge | 98.00 |
| E | 9 | 0.50 | any | 1301.07 | Air | 106.50 |
|   | 10 | 15.30 | any | 843.67 | BS1 | 109.00 |
| F | 11 | 30.60 / 108.12 / 109.86 | X3.1 / X7.0 / X9.7 | −334.75 | Air | 168.00 |
|   | 12 | 16.00 | any | −249.09 | Ge | 174.00 |

*Maximum field angle at entrance pupil = 46.4°

TABLE II

| | Approximate R.M.S. Spot Sizes in Object Space | | | | | |
|---|---|---|---|---|---|---|
| | Monochromatic at 9.6 microns Fields: | | | *Chromatic over 8.5–11.5 microns Fields: | | |
| Magnification | Axial | half | 1 | Axial | half | 1 |
| X9.7 | 0.059 | 0.058 | 0.075 | 0.069 | 0.070 | 0.086 }# |
| X7.0 | 0.305 | 0.373 | 0.524 | 0.306 | 0.375 | 0.526 |
| X3.1 | 0.559 | 0.726 | 0.899 | 0.560 | 0.727 | 0.900 |
| For the internal real image | 81.9 | 91.3 | 97.4 | 81.9 | 91.5 | 109.8}$ |

*Given as an equally weighted three wavelength accumulated measurement, the wavelengths being 8.5, 9.6 and 11.5 microns.
In milliradians
$ In microns.

What is claimed is:

1. An afocal zoom refractor telescope formed by a variable magnification achromatic objective system and a fixed focus eyepiece system aligned on a common optical axis and arranged to provide an internal real image, said objective system being formed by a primary lens element and three other lens elements and said eyepiece system being formed by two lens elements, each of the six lens elements being made of a material which has a useful spectral bandpass in the infrared wavelength region and having refractive surfaces intercepting said optical axis which are substantially spherical, that one of the other objective system lens elements which is proximal the primary lens element being colour corrective, with a V-value of not less than 120, negatively powered, having a lower refractive index than the remaining objective system lens elements, meniscus in shape and convex towards the real image and is fixedly coupled to the adjacent other objective system lens element which is meniscus in shape and concave towards the real image, said coupled lens elements having substantially zero separation between their adjoining refractive surfaces on said common optical axis, said separation increasing as distance off-axis increases and being mounted for movement in a first locus along the optical axis, the objective system lens element which is proximal the eyepiece system is mounted for movement in a second locus along the optical axis, and means are provided for simultaneously moving said lens elements non-linearly through said first and second loci whereby the magnification of said afocal zoom refractor telescope can be varied between minimum and maximum values.

2. A telescope as claimed in claim 1, wherein said one other objective system lens element is made of Chalcogenide glass, the remaining lens elements of the telescope being made of Germanium.

3. A telescope as claimed in claim 2, wherein said Chalcogenide glass is BS1.

4. A telescope as claimed in claim 1, wherein said one other objective system lens element has a refractive index at a wavelength of 10 microns and a temperature of 20° C. of not less than 2.45, each of the remaining lens elements of the telescope being made of a material having a refractive index at a wavelength of 10 microns and a temperature of 20° C. of not less than 4.0.

5. A telescope as claimed in claim 1, wherein the f/number at the internal real image is 2.51 throughout the magnification range between maximum and minimum values.

6. A telescope as claimed in claim 5, wherein said second locus is limited in extent to prevent said objective system lens element which is proximal the eyepiece system moving through the internal real image.

7. A telescope as claimed in claim 1, wherein the radius of curvature of each refractive surface is given together with the aperture diameter of each surface and of the telescope exit pupil the position of which pupil is used as a datum from which the separation of successive refractive surfaces is defined for the magnification value concerned, together with the nature of the material relevant to each such separation interval, in the following table:

| Item | Surface | Separation | Magnification Factor | Radius of Curvature | Material | Aperture Diameter |
|---|---|---|---|---|---|---|
| Exit Pupil | ∅ | 0 | any | Flat | Air | 15.30 |
| Eyepiece system | 1st refractive surface | 33.29 | any | −64.39 | Air | 43.00 |
| 1st lens element | 2nd refractive surface | 5.00 | any | −52.00 | Ge | 44.60 |
| Eyepiece system | 1st refractive surface | 17.50 | any | 66.72 | Air | 48.30 |
| 2nd lens element | 2nd refractive surface | 33.32 | any | 45.97 | Ge | 31.50 |
| Objective system | 1st refractive | { 66.00 / 35.42 | X3.1 / X7.0 } | −117.96 | Air | 73.50 |

-continued

| Item | Surface | Separation | Magnification Factor | Radius of Curvature | Material | Aperture Diameter |
|---|---|---|---|---|---|---|
| 1st lens element | surface | 16.93 | X9.7 | | | |
| | 2nd refractive surface | 10.02 | any | −79.60 | Ge | 77.00 |
| Objective system 2nd lens element | 1st refractive surface | 240.46<br>193.53<br>210.27 | X3.1<br>X7.0<br>X9.7 | −72.30 | Air | 90.00 |
| | 2nd refractive surface | 8.00 | any | −82.25 | Ge | 98.00 |
| Objective system | 1st refractive surface | 0.50 | any | 1301.07 | Air | 106.50 |
| 3rd lens element | 2nd refractive surface | 15.30 | any | 843.67 | BS1 | 109.00 |
| Objective system Primary (4th) lens element | 1st refractive surface | 30.60<br>108.12<br>109.86 | X3.1<br>X7.0<br>X9.7 | −334.75 | Air | 168.00 |
| | 2nd refractive surface | 16.00 | any | −249.09 | Ge | 174.00 | wherein numerical data is given in millimeters and negative radius of curvature denotes that the centre of curvature is on the exit pupil side of the surface whereas positive radius of curvature denotes that the centre of curvature is on the side of the surface remote from the exit pupil.

* * * * *